No. 649,048. Patented May 8, 1900.
H. FRASCH.
ART OF PURIFYING PETROLEUM.
(Application filed Dec. 10, 1888.)
(No Model.)
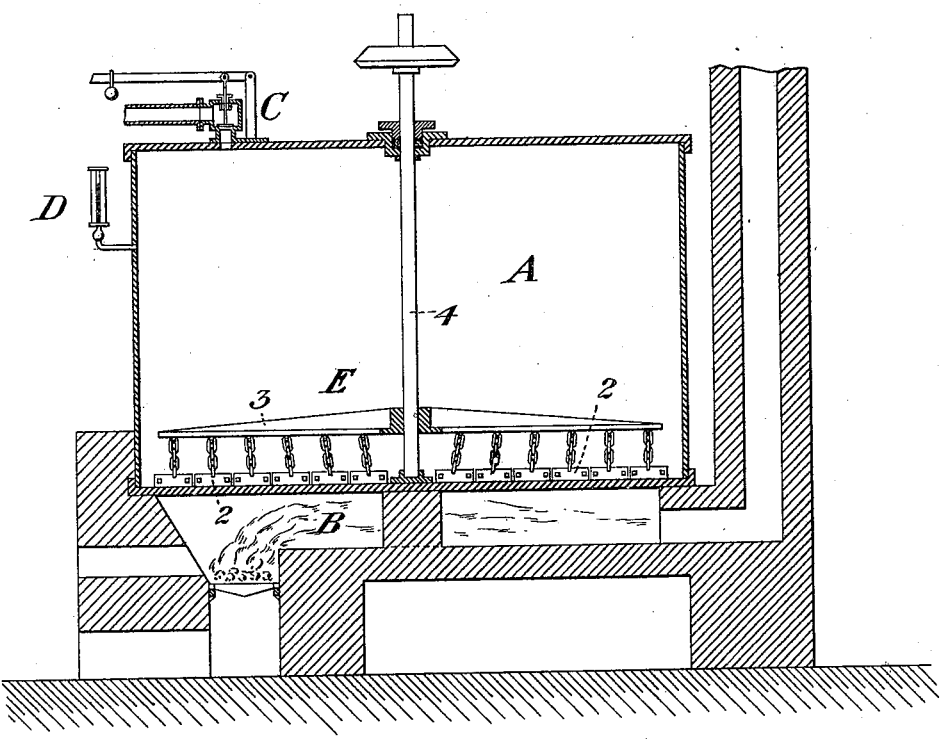
WITNESSES.
INVENTOR.
Herman Frasch
by W. Bakewell & Sons
his Attorneys.

UNITED STATES PATENT OFFICE.

HERMAN FRASCH, OF CLEVELAND, OHIO, ASSIGNOR TO THE SOLAR
REFINING COMPANY, OF OHIO.

ART OF PURIFYING PETROLEUM.

SPECIFICATION forming part of Letters Patent No. 649,048, dated May 8, 1900.

Application filed December 10, 1888. Serial No. 293,163. (No specimens.)

*To all whom it may concern:*

Be it known that I, HERMAN FRASCH, a citizen of the United States, residing at Cleveland, in the county of Cuyahoga and State of Ohio, have invented certain new and useful Improvements in the Art of Purifying Petroleum, of which the following specification is a full, clear, and exact description.

This invention relates to the purification of petroleum, undistilled and distillate, of that class of petroleum distinguished by the presence of a large proportion of sulfur compounds which resist the ordinary treatment for the removal of sulfur and which render the oil unfit for general use on account of their very disgusting odor. This oil usually contains more than one-half of one per cent. of sulfur, and being found chiefly in Canada and at Lima, in the State of Ohio, is generally known as "Canadian" oil or "Lima" oil. In a prior patent, No. 378,246, dated February 21, 1888, and in prior applications for patents I have described and claimed processes of deodorizing and purifying such oil, which involve the distillation of the oil. The present invention relates to a process of purification which is independent of distillation.

In an application for patent filed November 1, 1888, Serial No. 289,747, I have described and claimed a process in which the purification of the products sought thereby is not dependent upon their distillation; but said application is, except as to one improvement, limited to the treatment of "undistilled" petroleum, which term includes both there and in the present specification reduced oil, crude oil, residuums of distillation, and the like. The present invention is not so limited, but extends to the treatment of oils generally and covers the treatment of distillates as well as of undistilled petroleum. It also involves as an essential feature what is not essential to the process of my said application, Serial No. 289,747, although it may be used in carrying this latter into effect—namely, the operation of superheating the liquid oil, as hereinafter explained.

Before the date of my said several inventions it was the custom in Canadian refineries and in some refineries in the United States to take the burning-oil distillates or kerosene which had been treated with sulfuric acid and washed with water and to treat the same with an aqueous solution of plumbate of sodium, followed by the addition of powdered sulfur. The result was the deodorizing of the oil with the formation of a sulfid-of-lead precipitate and the separation of the soda solution, which settled out gradually. The operation was performed in the cold—that is to say, at ordinary atmospheric temperatures. If, however, the oil which has been deodorized by the plumbate-of-sodium solution is distilled, the distillate obtained therefrom has the malodor of the original skunk. My opinion is that the deodorization is due to the formation of an inodorous oxidated form of the skunk, in which the oxygen is so loosely bound that on distillation it is liberated and the skunk reduced to its original malodorous form. This opinion is in harmony with the further fact that by the aid of agents whose position as oxidants has been generally recognized I have produced a deodorized oil which yields on distillation an oil having the malodor of the original skunk. The malodorous distillate, moreover, from the inodorous oil, whether this has been deodorized with the plumbate-of-sodium solution or with one or other of the common oxidating agents, gives, with a clear solution of plumbate of sodium, the reaction which has come to be regarded among workers in this class of oil as characteristic of the skunk thereof—that is to say, the said malodorous distillate if clear and free from hydrogen sulfid turns to a canary-yellow color on addition thereto of a clear plumbate-of-sodium solution. If the oil contains hydrogen sulfid, this substance yields a black precipitate with the solution of the plumbate of sodium, which tends to conceal the canary-yellow. As examples of the substances whose positions as oxidants have been generally recognized and by the aid of which the aforesaid deodorized oil can be produced may be mentioned the solutions of chromic, stannic, arsenic, and nitric acids, gaseous nitrous acid, the hypochlorites of calcium, sodium, and potassium, the manganates and permanganates of potassium, sodium, and other metals, the peroxid of barium, mercuric nitrate, and the ferrate salts. Binoxid of manganese may also be mentioned. The metallic oxids which are soluble in skunk-bearing oil—such as the oxids of lead, copper, cadmium, silver, mercury, and other metals precipitable from their acid solutions with hydrogen sulfid—and also suitable compounds of such oxids are likewise capable (as I have found) of acting as oxidating agents toward the skunk, and thus deodorizing skunk-bearing oil, in such manner that the distillation of the so-deodorized oil, from which the metal has been precipitated as sulfid by powdered sulfur, yields a malodorous distillate showing the before-mentioned yellow discoloration on addition thereto of plumbate-of-sodium solution.

My present invention is based upon the additional discoveries which I have made—first, that the inodorous compound of oxygen and skunk, (or whatever the product of the treatment may be,) although so unstable as to suffer decomposition by distillation of the oil containing it, is nevertheless capable of sustaining temperatures above the distilling-point of said oil, provided it is during such superheating subjected to a superatmospheric pressure sufficient to prevent the distillation of the oil; second, that the said unstable compound is produced by superheating the liquid oil under the above conditions more readily and rapidly than it will be formed in the cold or than at the temperature of distillation, and, third, that such rapid deodorization, with the aid of superheating, can be effected without at the same time inducing objectionable decompositions in the oil. In accordance with the present invention, therefore, the skunk-bearing oil (distillate or undistilled) is subjected to the action of an oxidating agent or agents at a temperature above the temperature of distillation of said oil, vaporation thereof being prevented by an accumulation of superatmospheric pressure in the vessel wherein the treatment is performed. While the treatment may be carried out with substances generally which act as oxidants toward the skunk, there are advantages in using the oxidating agent or agents in a solid subdivided condition rather than in aqueous solution as being less apt to emulsify the oil and as being more readily separable therefrom. It is also considered most advantageous in many, if not in most cases, to employ as the oxidating agent or agents one or more of the metallic oxids soluble in skunk-bearing oil or one or more of the compounds of such oxids suitable for the purpose. As examples of suitable compounds may be mentioned the carbonates and the fatty or resinous salts of the metals which yield oxids soluble in skunk-bearing oil. The chromate, manganate, and borate of lead and the borate of copper may be mentioned as further examples. When metal, as well as oxygen, unites with the skunk in solution in the oil, said metal may be removed—as, for example, by precipitation with sulfur in powder—or it may be allowed to remain if its presence is not disadvantageous to the use to which the oil is to be put. Other reduced residues (as well as any excess of the oxidating agents) may be removed in any suitable way, or, where not injurious to the oil for the purpose for which it is designated, they may be left in the oil. The oil, with the oxidating agent or agents, is superheated in a close vessel to prevent volatilization of the oil and in the case of the heavier products also to prevent the formation of tarry bodies, and agitation is employed in conjunction with the superheating under pressure to bring about a thorough admixture and suspension of the oxidating agent or agents in the oil. Preferably the said agent or agents are employed in large excess of the quantity theoretically necessary to combine with the sulfur compounds, so as to insure a more thorough and rapid deodorization of the oil. The excess which settles to the bottom when the treatment is ended can be used on a fresh batch of oil. The completion of the deodorizing operation can be determined by withdrawing a sample and ascertaining if it is free from the malodor of skunk, or if, being clear, it does not change color on addition to the sample of plumbate-of-sodium solution.

The new process may be applied to oil which has been subjected to a prior treatment with sulfuric acid or to oil which has not been so treated.

To one hundred barrels of the skunk-bearing oil to be treated it will generally suffice to use two hundred pounds of finely-divided dry lead oxid (litharge) or a chemical equivalent of any other of the metallic oxids soluble in skunk-bearing oil. With other oxidants corresponding proportions may be employed. The oil and the oxidating agent or agents are agitated together at a temperature above the distilling-point of the oil under treatment in a close vessel at a superatmospheric temperature sufficient to prevent vaporization of said oil. When using litharge or other metallic oxid soluble in skunky oil as the oxidant, it is well to use in conjunction therewith a fatty or resinous acid to aid in effecting the solution. For example, about five hundred pounds of powdered colophonic acid, or, in other words, of common rosin, may be used with the two hundred pounds of litharge mentioned above. With litharge and rosin the deodorization should be complete in eight or ten hours or less. If no rosin is used, a longer time may be required. When the deodorization is complete, the deodorized oil may be drawn off from the undissolved matter, which settles to the bottom on the cessation of the agitation.

For heavy oil, whether distillate or reduced oil or residuum of a distilling-point below 400° Fahrenheit, the treatment may be carried on at about 400° Fahrenheit, and in case of heavy oil whose distilling-point is as much as 400° Fahrenheit the temperature of the treatment should of course be increased.

With kerosene or burning-oil the temperature of treatment may be below 300° Fahrenheit and with naphtha it may be below the boiling-point of water; but it is always to be above the distilling-point of the particular oil under treatment.

I claim as my invention or discovery—

1. The process of deodorizing oil of the Canadian or Lima class, by the prolonged subjection of the skunk-bearing oil to the action of an oxidating agent or agents in a closed vessel at a temperature above the distilling-point of the said oil under atmospheric pressure and under a pressure of vapor in said vessel above the vapor tension of the oil at said temperature, so that the oil is retained in the liquid state during such subjection, vaporization thereof being prevented by the excess of said pressure over the vapor tension of the said liquid oil, substantially as described.

2. The process of deodorizing oil of the Canadian or Lima class, by the prolonged subjection of the skunk-bearing oil to the action of a solid subdivided oxidating agent or agents in a closed vessel at a temperature above the distilling-point of the said oil under atmospheric pressure and under a pressure of vapor in said vessel above the vapor tension of the oil at said temperature, so that the oil is retained in the liquid state during such subjection, vaporization thereof being prevented by the excess of said pressure over the vapor tension of the said liquid oil, substantially as described.

3. The process of deodorizing oil of the Canadian or Lima class, by the prolonged subjection of the skunk-bearing oil to the action of one or more metallic oxids soluble in skunk-bearing oil in a closed vessel at a temperature above the distilling-point of the said oil under atmospheric pressure and under a pressure of vapor in said vessel above the vapor tension of the oil at said temperature, so that the oil is retained in the liquid state during such subjection, vaporization thereof being prevented by the excess of said pressure over the vapor tension of the said liquid oil, substantially as described.

In testimony whereof I have signed this specification in the presence of two witnesses.

HERMAN FRASCH.

Witnesses:
F. W. LOTHMAN,
WM. V. KEEGAN.